Nov. 20, 1945.   O. E. ESVAL ET AL   2,389,143
SEXTANT
Filed June 11, 1942   2 Sheets-Sheet 1
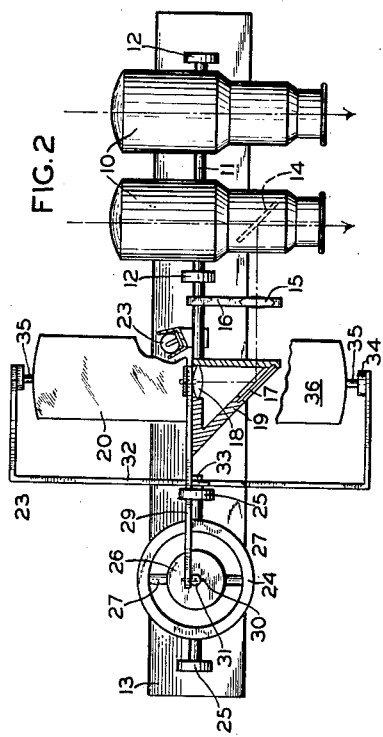
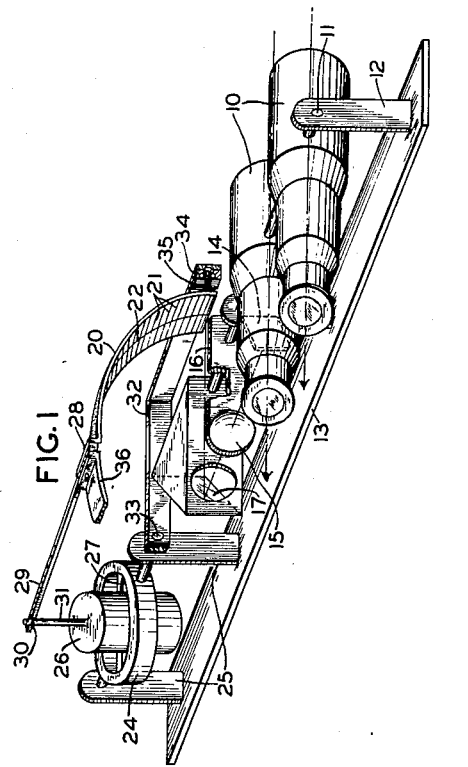
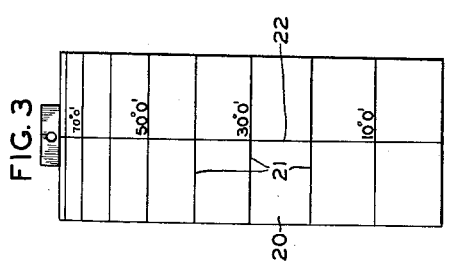
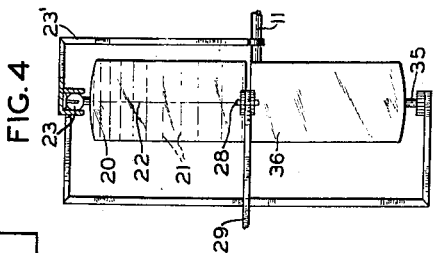
INVENTOR
ORLAND E. ESVAL
WALTER WRIGLEY
BY
Herbert H. Thompson
ATTORNEY.

Nov. 20, 1945.  O. E. ESVAL ET AL  2,389,143
SEXTANT
Filed June 11, 1942   2 Sheets-Sheet 2

INVENTOR
ORLAND E. ESVAL
BY WALTER WRIGLEY
Herbert H. Thompson
ATTORNEY.

Patented Nov. 20, 1945

2,389,143

UNITED STATES PATENT OFFICE 2,389,143

SEXTANT

Orland E. Esval, Huntington, and Walter Wrigley, East Hempstead, N. Y., assignors to Sperry Gyroscope Company, Inc., Brooklyn, N. Y., a corporation of New York Application June 11, 1942, Serial No. 446,660

2 Claims. (Cl. 88—2.3)

This invention relates to sighting instruments that are especially adapted for use to assist in the navigation of aircraft. More particularly, the invention is concerned with a sextant by means of which an observer's position with respect to the earth may be definitely determined with knowledge of the simultaneous altitudes of two stars obtained by use of the instrument and the correct Greenwich civil time of the observations.

An object of the invention is to provide a sighting instrument of this character whose reticle is fully stabilized at all altitude angles. As herein shown, the reticle of the instrument is formed of a portion of a hollow globular shell. In the present instance, the reticle is stabilized by means of a gyro vertical and a part of the hollow shell is viewed by an object lens that turns with the the object viewing means included in the optical system, in raising or lowering the line of sight for changing altitude angles. In one form of the invention, a collimating lens having a focal length corresponding to the radius of the shell is situated at the center of curvature of the curved reticle. In this manner, the stabilized reticle is viewed only in that section which corresponds to the altitude of the star. The reticle being graduated in degrees of altitude forms a scale on which the altitude of the observed star may be read directly.

A feature of the invention resides in the provision of an instrument whose stabilized and calibrated reticle is viewed along a line of sight parallel to the line of sight of the object viewing means.

Other objects, features and structural details of the invention will be apparent from the following description when read in connection with the accompanying drawings, wherein Fig. 1 is a perspective view showing a desirable schematic arrangement of the parts constituting the sighting instrument of the present invention.

Fig. 2 is a plan view of the instrument shown in Fig. 1.

Fig. 3 is an enlarged detail elevation of the reticle utilized in the improved sextant.

Fig. 4 is a detail view showing a translucent type of reticle utilized in the improved instrument.

Figure 6:
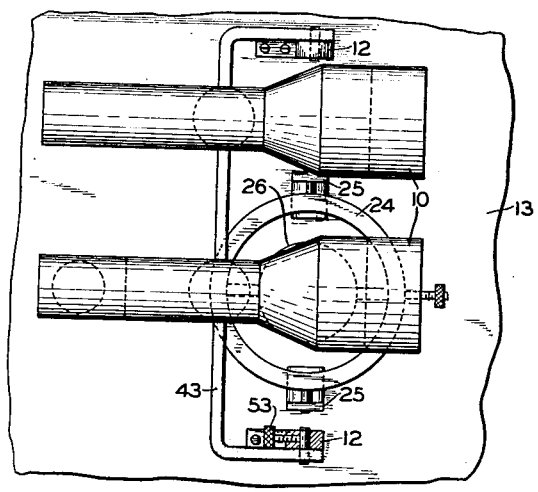
Fig. 6 is a plan view of the instrument shown in Fig. 5.

With reference to Figs. 1 to 4, inclusive, a sextant constructed in accordance with the present invention is shown to include a sighting instrument in the form of binocular telescopes 10 which may be of the well known Galilean type. The telescopes are mounted to pivot about a normally horizontal elevation axis, such mounting being provided in the instant case by means of rockshaft 11, bearing posts 12 and a suitable base or frame 13 on which the posts are fixed. It will be understood that any suitable mechanism may be provided to position the base 13 so that the sighting instrument is placed in such a manner as to be readily used by the observer. The object or star whose angular altitude is to be measured by the sextant is sighted by the observer through the binocular telescopes 10, the focused image of the object being observed at the eye piece of the instrument in the customary manner. The binoculars move together and proportionally effect movement of the rockshaft 11 about its horizontal axis, the shaft and binoculars being joined together in any suitable manner. It will be understood, that when the telescopic instrument is directed to sight the object, the same is positioned angularly, with respect to a horizontal reference plane, at the elevation angle which it is desired to ascertain.

In the arrangement shown in Fig. 1, the lefthand binocular telescope is constructed to include a fixed reflex mirror 14 by means of which the images of the sighted object and the hereinafter described reticle are superimposed so that one of the eyes of the observer sees a field which contains both the image of the sighted object and a portion of the reticle. Reflex mirror 14 is disposed in 45° relation, as shown in Fig. 2, to the longitudinal axis of the left-hand binocular telescope 10. The optical system of the sighting instrument further includes an image erecting or object lens 15 which is situated on an arm 16 fastened to an extension of rockshaft 11. The system also includes a mirror 17, positioned in spaced parallel relation to reflex mirror 14, and a collimating lens 18 mounted on the axis of the rockshaft 11. Lens 18 and mirror 17 are shown situated in a suitable box enclosure 19 which is fixed to the end of the shaft 11. Box 19 and the parts contained therein, lens 15 and the binocular telescopes 10 consequently are arranged to move as a unit about the axis provided for such movement by shaft 11. The reticle, as designated at 20, is mounted on the frame or base independently of the previously described parts of the sighting instrument, and is curvedly shaped. A portion of a hollow globular shell is employed as the reticle in this particular instance. The collimating lens of the sighting instrument's optical system is focused on the reticle, the same being shown as located at the center of curvature of the spherically shaped reticle. The position of this lens with respect to the reticle is determined by the angular inclination of the binoculars 10 above the horizon. A common focal point in the instrument's optical system is provided for both the main object lens of the left-hand binocular telescope and the object lens 15. The collimating lens and associated telescope are mounted on shaft 11 so that the lines of sight of these respective parts are maintained in parallel relation at all times.

With reference to Fig. 3, the interior surface of the reticle 20 provides an altitude scale formed by evenly spaced arcs indicated at 21 with altitude indications noted therewith in degrees and minutes. A meridian arc 22 may also be included in the altitude scale. Reticle 20 is stabilized in a horizontal plane by a suitable means so that when the telescope is sighted on the horizon, the collimating lens 18 is focused on the zero altitude indication of the reticle scale. As the telescopic element is inclined upwardly about the shaft 11, from this position, the collimating lens turns correspondingly to bring other portions of the scaled reticle into view. Consequently, the observer sees in superimposed relation both the image of the sighted object or star and the image of that portion of the scaled reticle on which the collimating lens is focused. This enables the angular altitude of the object to be read off directly by the observer. The upper limit of the reticle scale employed in the present instance is 90 degrees. A suitable means is shown to provide illumination of the reticle 20 which is in the form of an electric light 23 situated on the shaft 11. The reticle shown in Fig. 2 is constructed of an opaque material and the scaled indications thereon are situated on its inner face which the lamp 23 illuminates.

A modified form of reticle 20 is illustrated in Fig. 4. In this instance, the same is made of a suitable transparent material and the light 23 is situated exteriorly thereof at the end of a bracket piece 23' which is fixed to the shaft 11. The means employed to provide stabilization of the reticle 20, in this instance, is a gyro vertical instrument of conventional construction. As shown in Figs. 1 and 2, the schematic representation of this instrument noted therein includes a gimbal ring 24 pivotally mounted on posts 25 situated on the frame 13. In the arrangement employed, the major axis of the gyro vertical or the axis of the gimbal ring is shown coaxial with the axis of the binocular supporting shaft 11. The rotor bearing case 26 of the stabilizing instrument is pivotally mounted within ring 24 by means of suitable trunnions 27 which define the customary minor axis of the gyro instrument. The axis of the rotor bearing case is perpendicular to the axis of the gimbal ring 24. A gyro rotor (not shown) contained within the rotor bearing case is driven by suitable means (not shown) with its spin axis situated in a normally vertical position. Also, suitable erecting means (not shown) are employed with the gyro vertical instrument to maintain the spin axis of the gyro rotor in a properly erected position.

In this instance, the universally mounted reticle 20 of the sextant is stabilized by the gyro vertical through a suitable linkage with the polar axis of the spherical segment arranged in parallel relation to the spin axis of the gyro rotor. Such linkage, as shown, includes pivot connection 28, link 29, pivot connection 30 and the fixed vertically extending arm 31 situated on the rotor bearing case 26. The mounting support for the reticle also includes a U-shaped frame 32 that is centrally fixed to an extending portion of one of the trunnions of the gimbal ring, as indicated at 33. The arms of the frame 32 include oppositely disposed bearings 34 for receiving trunnions 35 respectively fixed to the exterior face of the reticle and to the corresponding part of a dummy piece 36 which is formed to operate as a unit with the reticle. Trunnions 35 are arranged in parallel relation to the minor axis defining trunnions 27 of the gyro instrument. The sextant gives the same visual indication one would have, were it possible to view the celestial object from the center of a sphere which is stabilized with respect to the earth. The indications would also include circular parallels of altitude noted on the surface of the sphere whose scaled notations were in focus at the observed star. The binocular telescopes can be employed for other obvious purposes.

Figure 5:
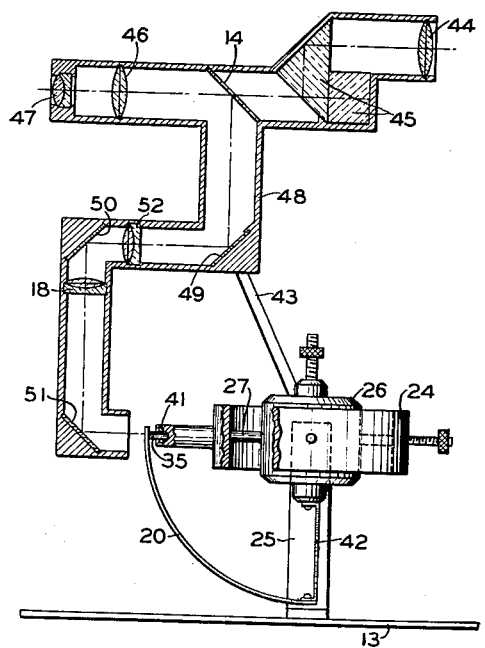
Fig. 5 is a side elevation view of a modified form of sextant constructed in accordance with our invention.
Figure 7:
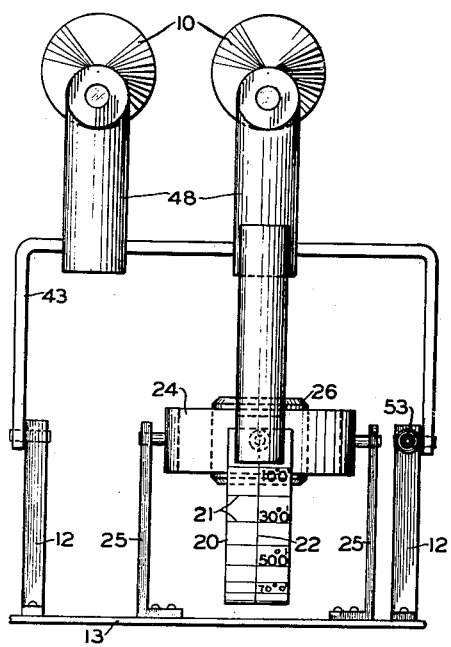
Fig. 7 is a rear elevation view of the modified instrument.

In the modified form of the invention shown in Figs. 5 to 7, inclusive, similar reference numbers are used to indicate the parts of the instrument which correspond with the heretofore described embodiment of the invention. The spherically shaped reticle 20 is independently and universally mounted. It is further stabilized by a suitable gyro vertical and is shown mounted with relation to the same by means of a bearing connection 41 on a projecting portion of one of the trunnions provided for mounting the rotor bearing case within the gimbal ring. A downwardly extending arm 42 located on the rotor bearing case is suitably fixed to the other end of the spherical reticle. The reticle is consequently positioned so that its center of curvature is located at the intersection of the respective perpendicularly arranged normally horizontal axes providing universal support for the rotor bearing case of the gyro vertical instrument. The binoculars 10 are mounted for movement about a normally horizontal axis on a yoke 43, such axis being coincident with one of the axes of universal mounting of the reticle. The binoculars include a conventional optical system shown, in the instant case, as provided by object lens 44, prisms 45, lens 46 and eye piece 47. As also provided in the form of the invention hereinbefore described, one of the binocular telescopes 10 includes a reflex mirror 14 by means of which the images of the sighted object and a portion of the reticle are viewed in superimposed relation. In this instance, the optical system of the sextant also includes a tube 48 having therein the angularly disposed cooperating mirrors 49, 50 and 51. The system's collimating lens 18 may be positioned in the tube 48 between the mirrors 50 and 51. The open end of tube 48 is disposed adjacent to the reticle which is situated at the focal point of the collimating lens 18. The image of the reticle is properly focused in the main optical system of the telescope by means of lens 52. In this provided arrangement of the parts, the collimating lens 18 moves with the sighting instrument in a path concentric with the curved reticle or, in other words, in a curved path, the center of curvature of which is substantially coincident with the center of curvature of the reticle. In this instance the altitude calibrations on the reticle are situated on the exterior surface of the hollow globular shell, the arrangement of the indications thereon being the reverse of the type of reticle shown in Fig. 3. Suitable means for illuminating the reticle (not shown) may also be provided in the proper position. When not in use, the binoculars may be fixed in position by means of a suitable thumb screw 53.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A sextant having a spherically-shaped reticle calibrated in degrees of altitude, a frame on which said reticle is universally mounted for movement about mutually perpendicular, normally horizontal, axes, means for stabilizing said universally mounted reticle, means movable about an axis coincident with one of the axes of universal mounting of the reticle for viewing the object whose altitude is to be measured along a line of sight, means movable with said object viewing means for viewing said reticle along a line parallel to the line of sight of said object viewing means, and means for combining an image of said reticle with the image of the sighted object.

2. A sextant comprising a sighting device movable about a horizontal axis through which the object whose altitude is to be measured is observed, a reticle formed of a portion of a hollow globular shell calibrated in degrees of altitude, a frame on which said reticle is mounted to pivot about two mutually perpendicular, normally horizontal, axes with the center of curvature thereof at the intersection of the axes and with one of the axes coincident with the axis of said sighting device, means for stabilizing said reticle about its axes, means movable with said sighting device for viewing said reticle along a line parallel to the line of sight of said sighting device, and means for combining an image of said reticle with the image of the sighted object.

ORLAND E. ESVAL.
WALTER WRIGLEY.